United States Patent [19]

Stettler et al.

[11] 3,797,088

[45] Mar. 19, 1974

[54] METHOD OF MANUFACTURING CYLINDRICAL BLANKS

[75] Inventors: Christian H. Stettler, Northbrook; Hans R. Luedi, Highland Park; Albert Roze, Chicago, all of Ill.

[73] Assignee: Grotnes Machine Works, Inc., Chicago, Ill.

[22] Filed: Sept. 8, 1972

[21] Appl. No.: 287,561

[52] U.S. Cl..................... 29/159.1, 29/417, 82/53.1, 113/120 N
[51] Int. Cl............................ B21h 1/10, B21k 1/38
[58] Field of Search............. 29/159.1, 33 D, 477.3, 29/417, 412, 481; 82/53.1; 113/120 N; 228/5, 15, 17

[56]  References Cited
UNITED STATES PATENTS

| 933,104 | 9/1909 | Norton | 113/120 N |
| 2,038,483 | 4/1936 | Ferguson et al. | 113/35 |
| 3,165,034 | 1/1965 | Cvacho | 82/53.1 |
| 3,201,559 | 8/1965 | Morris | 219/62 |
| 3,262,624 | 7/1966 | Benteler et al. | 228/17 |

FOREIGN PATENTS OR APPLICATIONS

| 454,840 | 3/1949 | Canada | 113/120 N |

Primary Examiner—Charles W. Lanham
Assistant Examiner—Victor A. DiPalma
Attorney, Agent, or Firm—Wolfe, Hubbard, Yeydig, Voit & Osann, Ltd.

[57]  ABSTRACT

The method of forming cylindrical shells such as the type used for the production of automobile wheel rims, wherein a strip of sheet metal material is spirally wound into an elongated pipe, the abutting edges of the wound strip are welded and trimmed, and the free-end of the pipe is cut into the cylindrical shells of predetermined width as the pipe advances longitudinally with the spiral formation taking place at the opposite end.

2 Claims, 5 Drawing Figures

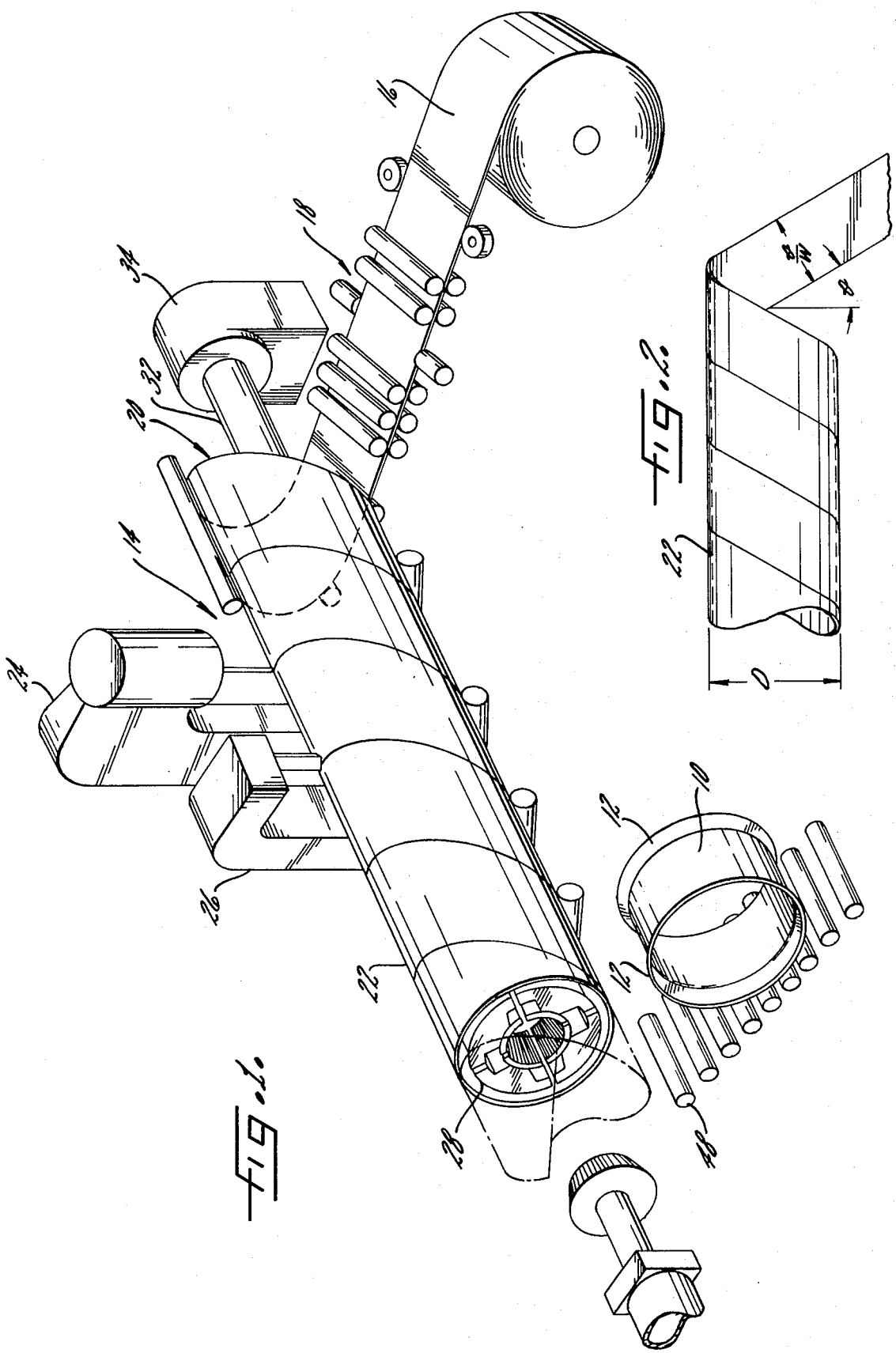

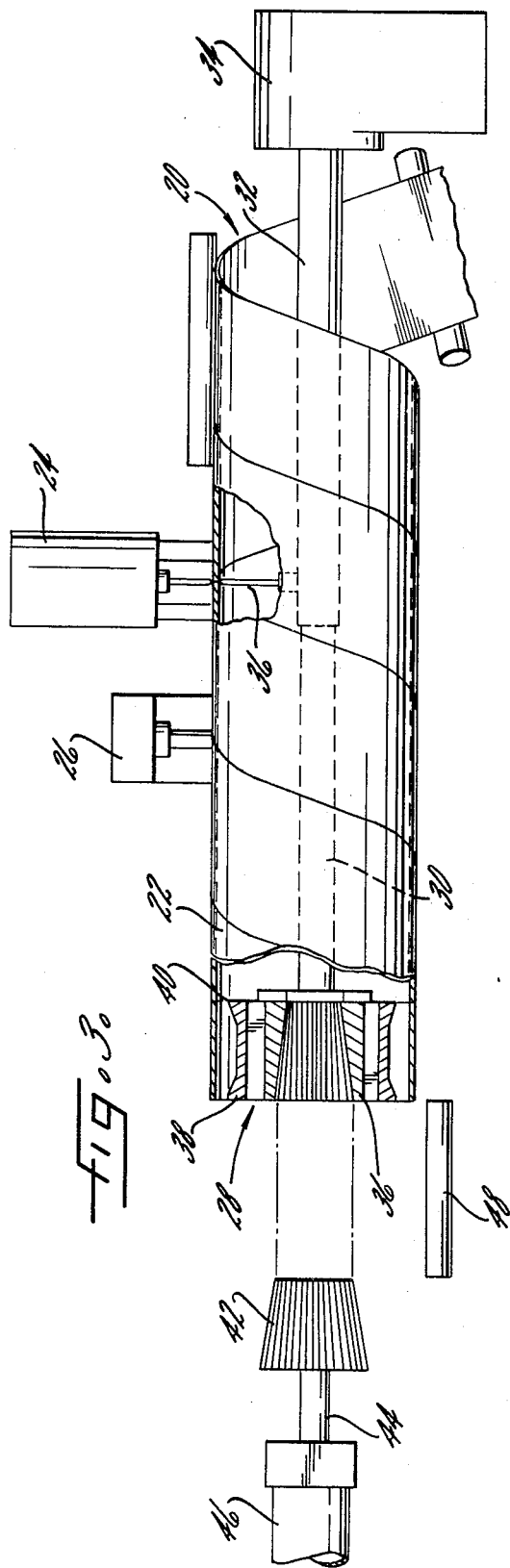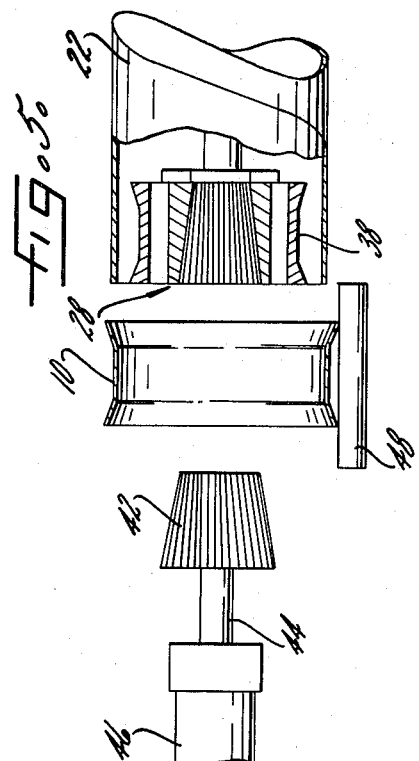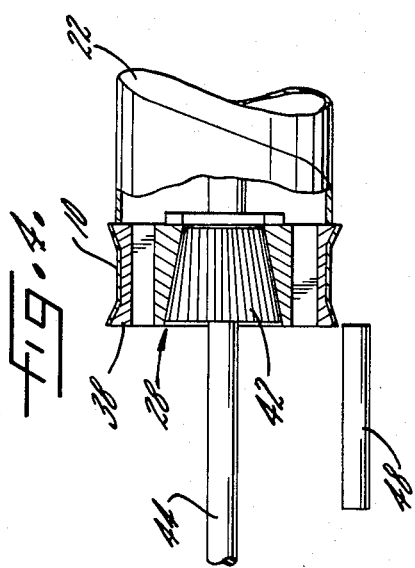

METHOD OF MANUFACTURING CYLINDRICAL BLANKS

DESCRIPTION OF THE INVENTION

The present invention relates in general to forming cylindrical shells from strip material and in its principal aspect concerns an improved method for forming generally cylindrical shells made, for example, of metal sheet material, yet wherein such shells can be economically formed in different sizes without costly equipment change over and down time and which minimizes the equipment necessary to produce a comparable number of shells on a mass production basis.

There are many manufactured products, particularly the steel automobile wheel, as an example, that are produced from cylindrical shaped shells which serve as the foundation for the finish forming processes. Numerous different approaches have heretofore been employed to produce shells used in the manufacturing of such steel automobile wheels and like products including as an example that disclosed and claimed in Christian H. Stettler U.S. Pat. No. 3,662,940, assigned to the assignee of the present invention.

The operation there involved starts out with the coil of sheet metal at a predetermined width which is unwound and passed through straightening rolls, whereupon it is cut to the required length and the pre-cut blank is coiled about a mandrel to form the shell and then its ends are welded. Following the welding operation the cylindrical formed sheel is subjected to weld and edge trimming operations to prepare it for the subsequent wheel forming processes. This procedure is essentially intermittent and for high production, duplication of the manufacturing equipment is needed so that the production can be brought up to the same rate as in a continuous operation.

Continuous operations which have been given consideration in the past prepare the cylindrical shells from a pipe produced either by a ring forming process or the continuous roll forming of the strip unwound from the coil. The desired widths of shells are simply cut from the produced pipe.

In either case, the foregoing processes present disadvantages where different sized shells are required. Again, such as for example in the automobile wheel situation, there are numerous wheel sizes that are produced from year to year and even in a given year with different models as well as the differences amongst the several manufacturers.

In the case of the pre-cut blank coiling operation, change over to a different line or change over of various components of the equipment in the line is required to accomodate the different size blanks for varying the desired shell sizes. This occurs because the pre-cut blank must be sized according to the width and diameter of the shell to be formed therefrom.

Where pipe is first made and then cut to produce the requisite shell sizes, there is likewise a need to effect production line changes for the different size pipe manufactured and where the plants run various sizes of wheels, stocking and storage of the different diameter pipe poses additional problems.

Moreover, the production of pipe in the first instance is accomplished at a rate much greater than needed for a single wheel production line so that there is little justification for a pipe producing facility without a substantial number of wheel producing lines to utilize the pipe production.

Accordingly, it is a general aim of the present invention to provide an improved cylindrical shell forming method which overcomes all of the foregoing disadvantages and which is characterized by the ability to produce shells of desired widths and diameters selectively from strip material and with a minimum of required equipment to achieve the high production rates of multiple forming lines. While the present invention will find especially advantageous use in the formation of cylindrical shells for use in the production of automobile wheels, it is not so limited in its scope. Thus, the invention will also find use in the forming of cylindrical shells for a wide range of products wherein relatively small width shells are needed for further production operations and particularly where it may be required to change sizes of the shells in diameter and/or width frequently.

Another object of the invention is to provide a novel method for forming relatively short width cylindrical shells made of sheet metal which is completely automatic in operation and characterized by its ability to form, on a repetitive basis, a large variety of shells of different diameters and widths which may be accomplished with only one width of strip stock that may be handled in a simplified coiled manner.

An ancillary object of the present invention is the provision of an improved cylindrical shell forming method which is substantially more economical than conventional methods since less equipment is necessary to keep up with the production rate of current needs for such shells and the set up time from one shell size to another is considerably shorter than heretofore known and used methods.

Other objects and advantages of the invention will become apparent as the following description proceeds, taken in conjunction with the accompanying drawings, in which:

FIG. 1 is a perspective view of metal strip material being formed into spiral pipe, welded and made into cylindrical shells in accordance with the method of the present invention;

FIG. 2 is a reduced top elevation view of a sprially formed length of pipe used for the formation of shells in accordance with the method of FIG. 1;

FIG. 3 is a partial top plan view, with portions broken away, of the arrangement shown in FIG. 1, here illustrating the operations carried out by the method;

FIG. 4 is a fragmentary front view illustrating the cutting-off of a cylindrical shell from the sprially formed pipe end; and FIG. 5 is a fragmentary front view similar to FIG. 4 here illustrating the completed cut-off shell formed for use in further manufacture of an automobile wheel.

While the invention is susceptible of various modifications and alternative forms, specific embodiments and procedures thereof have been shown by way of example in the drawings and will herein be described in detail. It should be understood, however, that it is not intended to limit the invention to the particular form and procedure disclosed, but, on the contrary, the intention is to cover all modifications, equivalents and alternatives falling within the spirit and scope of the invention as expressed in the appended claims.

Referring now to the drawings, there is illustrated in FIG. 1 a cylindrical shell 10 including partially deformed upturned peripheral end flanges 12 making the shell particularly suitable for use in the formation of automobile wheels which are here made by the method in accordance with the present invention.

In the exemplary arrangement illustrated, the apparatus, generally indicated at 14 suitable for manufacturing the shells 10 includes a coiled supply of metal strip material 16 which is fed through straightening and guide rolls 18 to a spiral pipe winding station 20 where the strip is continuously wound into the form of a spiral pipe 22. Spiral pipe forming apparatus are generally known and for details of commercial or available apparatus, cross-reference may be made to the trade literature and descriptive brochures of such equipment.

In the formation of the spiral pipe, as indicated in FIG. 2, the helix angle $\theta$ determined by the angle in which the strip material is brought in with respect to the axis of the spiral winding apparatus gives rise to the following relation:

$\sin \theta = w/D;$ where $w$ equals the width of the strip material and D equals the diameter of the spiral pipe formed. Thus, with a constant width of material it may be readily seen that the diameter D of the pipe to be formed may be readily changed by adjustment of the helix angle for the strip material being wound. This permits the arrangement wherein a single line can produce the desired diameter basic pipe as it is needed for use in production of the cylindrical shells required for the particular size wheels or the like being formed.

As the spiral winding takes place, the pipe formed advances axially and the abutting ends of the spiral wound strip material are suitably welded with welding apparatus 24, which may be an electric arc welder or any other type of welding arrangements that are well known to those skilled in the art. Disposed adjacent to the welding apparatus is a weld trimming machine 26 which removes burrs and weld build-ups to produce a clean, substantially flat surface on the spiral weld joint.

In accordance with one of the features of the present invention, the desired cylindrical shells are cut from the leading end of the spiral formed pipe as the trailing end is being formed. To accomplish this, as illustrated in the exemplary form depicted in the drawings, and referring to FIGS. 1 and 2, conjointly, an annular radially expansible die unit 28 is disposed within the formed pipe adjacent the free end and carried by an axially extending longitudinally movable shaft 30. The shaft 30, in turn is telescoped into a support sleeve 32 carried by frame 34 which includes an actuator (not shown) to longitudinally move the shaft. The sleeve 32 also serves to carry the inner electrode 36 of the welding apparatus 24.

In order to cut-off the desired cylindrical shell 10 from the pipe end which is advancing as the pipe is being spirally formed at the opposite end, the die unit 28 is radially expanded while provision is made for the die unit to move longitudinally at the same rate of travel and in the same direction as the pipe is being moved. The radial expansion of the die unit not only serves to cut-off the desired shells, but it also functions to partially form, work harden and size the shells within predetermined limits.

The radially expansible die unit 28 is made up of a plurality of segments disposed in an annular array with each of the segments having a tapered lower portion defining a frusto-conical shaped camming surface disposed about a central opening. Outer segmented die members 38 provided the forming and cut-off surfaces. Thus the right-hand edge 40 of the die segments 38, as viewed in FIG. 3, serve upon expansion to cut the pipe 22 thereby forming a shell having a width substantially equal to the width of the die unit. In addition, the dies 38, here shown, are shaped so as to partially deform the shell with upturned peripheral edges when the die unit is fully expanded in the radial direction. The particular shape illustrated is suitable for an initial stage in the formation of the rims for automobile wheels since the partial flanging of the shell edges provides a reduction in the number of subsequent deforming steps required to make the final wheel configuration.

In order to expand the die unit 28, there is provided a frusto-conical mandrel 42 carried by shaft 44 and longitudinally shiftable toward the outer end of the die unit by a fluid operated cylinder 46 or the like.

The arrangement is such that the mandrel 42 is advanced to the right, as viewed in FIG. 4, until it enters the central opening of the die unit 28 and expands the dies 38 outwardly to shear-off a shell 10 from the end of pipe 22. The mechanisms may be timed so that the mandrel 22 enters the die unit when the leading edge of the pipe is just about to move over an exit conveyor 48 and as soon as the mandrel has fully entered and expanded the die unit 28 any relative movement therebetween is discontinued and the mandrel begins movement to the left along with the die unit as viewed in FIG. 4.

Once the die unit and cut-off shell 10 are disposed over the conveyor 48, the mandrel 42 is retracted completely to the left as viewed in FIG. 5 and the die unit in its radially contracted position moves back to the right until it is positioned with the end of the pipe in readiness for production of the next proceeding shell. The previously produced shell 10 then moves horizontally along the conveyor 48 (FIG. 1) where it may be taken to storage or to further production operations. The cycle is then repeated for each subsequent shell cut-off from the pipe end.

In accordance with yet another feature of the present invention the cutting off of the desired shells from the spirally formed pipe end by radially outwardly expanding the die unit 28 disposed within the pipe permits the cut-off shell to be work hardened and sized and at the same time a closer tolerance of roundness may be achieved by the expanding dies.

Since the shell 10 is radially expanded as it is cut from the pipe 22, the diameter of the pipe is selected to be slightly smaller than that of the required finished diameter of the shell. To change the size of the shell produced, different diameter pipe may be made by adjustment of the helix angle as previously indicated and the dies or die unit may be readily changed to increase or decrease the width of the shell as well as the diameter desired.

It will be appreciated that a single shell production line utilizing the method and procedure of the present invention is capable of achieving production rates comparable to present automobile wheel rim lines wherein approximately 1,000 to 1,200 rims per hour are made, but wherein each such line requires two coilers, welders, and edge and weld trimmers.

We claim as our invention:

1. The method of producing cylindrical shells from strip, sheet metal material comprising the steps of spirally winding said strip material into an elongated pipe from, welding abutting edges of said spirally wound pipe, trimming the weld and cutting off the free end of said formed pipe into cylindrical shells while the pipe is being continuously formed from the opposite end, said shells being cut from the pipe by radially expanding means disposed within said pipe and wherein during the cut-off the shells are partially formed and expanded for sizing, hardening and rounding within predetermined limits.

2. The method of forming cylindrical shells of predetermined width and diameter from a strip of sheet metal material as used for the production of automobile wheel rims and the like, comprising the steps of spirally forming said strip material into an elongated pipe, welding the adjoining edges of the spirally wound strip as it advances during said spiral winding operation, cutting the free end of said pipe into cylindrical shells of predetermined width as its free end advances longitudinally with the spiral formation of the pipe at the opposite end, said shells being cut from the pipe by radially expanding means disposed within said pipe, and said radially expanding means forms upturned peripheral edges on said shells during the cut-off.

* * * * *